United States Patent [19]
Schittler et al.

[11] Patent Number: 5,577,892
[45] Date of Patent: Nov. 26, 1996

[54] METHOD OF INJECTING FUEL INCLUDING DELAYED MAGNETIC SPILL VALVE ACTUATION

[75] Inventors: Michael Schittler, Sindelfingen; Ulrich Augustin, Kernen; Volker Schwarz, Weinstadt; Hermann Hiereth, Esslingen, all of Germany

[73] Assignee: Mercedes Benz AG, Stuttgart, Germany

[21] Appl. No.: 621,829

[22] Filed: Mar. 22, 1996

Related U.S. Application Data

[63] Continuation-in-part of Ser. No. 344,884, Nov. 25, 1994, abandoned.

[30] Foreign Application Priority Data

Nov. 26, 1993 [DE] Germany .......................... 43 40 311.5

[51] Int. Cl.$^6$ .................. F04B 53/10; F02D 1/00
[52] U.S. Cl. .................. 417/53; 417/290; 417/440; 417/502; 417/505; 123/500; 123/506
[58] Field of Search .................. 417/53, 290, 440, 417/499, 505, 502; 123/500, 506, 458

[56] References Cited

U.S. PATENT DOCUMENTS

| | | | |
|---|---|---|---|
| 4,083,346 | 4/1978 | Eheim | 417/440 |
| 4,412,519 | 11/1983 | Hoch et al. | 123/458 |
| 4,505,240 | 3/1985 | Shinoda et al. | 123/506 |
| 4,505,243 | 3/1985 | Miwa | 123/458 |
| 5,357,933 | 10/1994 | Kasahara et al. | 123/458 |

*Primary Examiner*—Timothy Thorpe
*Assistant Examiner*—Roland G. McAndrews, Jr.
*Attorney, Agent, or Firm*—Klaus J. Bach

[57] ABSTRACT

In a method of injection fuel for Diesel engine comprising a high pressure injection pump with a fuel supply line for supplying high pressure fuel to fuel injection nozzles wherein a fuel control line extends between the pump and a low pressure fuel supply line for discharge in excess fuel thereto under the control of a magnetic valve which is closed to end the discharge of excess fuel and initiate pumping of fuel, the magnetic valve is opened at the end of fuel pumping at a point corresponding to a piston stroke length h after the upper dead center of the piston such that, when communication between the pump and the low pressure fuel line is established, pressure pulses in the low pressure fuel line are avoided.

2 Claims, 2 Drawing Sheets

METHOD OF INJECTING FUEL INCLUDING DELAYED MAGNETIC SPILL VALVE ACTUATION

This is a Continuation-In-Part application of application Ser. No. 08/344,884 filed Nov. 25, 1994, now abandoned.

BACKGROUND OF THE INVENTION

The invention relates to a method of injecting fuel for an internal combustion engine with high pressure fuel injection, with a high pressure pump having a cylinder with a pumping chamber delineated by a piston, and a control line which extends between the pumping chamber and a low pressure induction line and includes a magnetic valve, and a high pressure line which extends between the pumping chamber and at least one fuel injection nozzle and which includes a magnetic check valve, wherein the beginning and the end of the fuel injection is initiated by opening and closing of the magnetic valve.

The ATZ/MTZ special issue Motor und Umwelt '92, pages 28 ff. presents, on page 28, an article entitled "Electronic Controlled Fuel Injection for Clean Diesel Engine" by Toshihiko Amori, wherein an arrangement with a magnetic valve-controlled high pressure pump is described which, after closing the passage supplying fuel to the pumping chamber, feeds fuel via a high pressure line including a check valve to a common rail supply conduit from which fuel is supplied to all the injection nozzles.

By way of an electromagnetic valve arranged in a return line extending between the high pressure line and a low pressure line the fuel supply is controlled in dependence on the fuel supply requirements.

It is known from DE 21 07 266 C 2 to terminate the pressurized fuel supply to a common rail supply conduit depending on the demand for fuel; but this is achieved by a high pressure pump with inclined edge control of the termination of the compression stroke of the pump by which excess fuel is discharged into a conduit leading to a fuel storage. This procedure however results in a sudden fuel release with a rapid pressure collapse in the pump compression space.

It is further known from DE 34 36 768 C2 to control fuel supply depending on the requirements by means of a magnetic valve arranged in the low pressure fuel line, but with this arrangement, a controllable fuel pressure level should always be present for any injection procedure at the start of injection.

It is the object of the invention to provide a method of injection fuel with high fuel pressures by which pressure pulses which normally occur in the low-pressure fuel circuit when communication with the low pressure fuel circuit is re-established at the end of each compression stroke of the fuel pressurizing pump are avoided.

SUMMARY OF THE INVENTION

In a method of injection fuel for a Diesel engine comprising a high pressure injection pump with a fuel supply line for supplying high pressure fuel to fuel injection nozzles wherein a fuel control line extends between the pump and a low pressure fuel supply line for discharge in excess fuel thereto under the control of a magnetic valve which is closed to end the discharge of excess fuel and initiate pumping of fuel, the magnetic valve is opened at the end of fuel pumping at a point corresponding to a piston stroke length h after the upper dead center of the piston such that, when communication between the pump and the low pressure fuel line is established, pressure pulses in the low pressure fuel line are avoided.

Because communication between the pump operating chamber and the low pressure fuel supply circuit is restored after the pump piston has passed the upper dead center position and the fuel pressure has fallen essentially to the pressure level in the fuel supply line, the generation of pressure pulses upon opening of the magnetic valve is avoided. Furthermore, part of the compression energy expensed during the compression stroke of the pump is regained.

DESCRIPTION OF A PREFERRED EMBODIMENT

Figure 1:
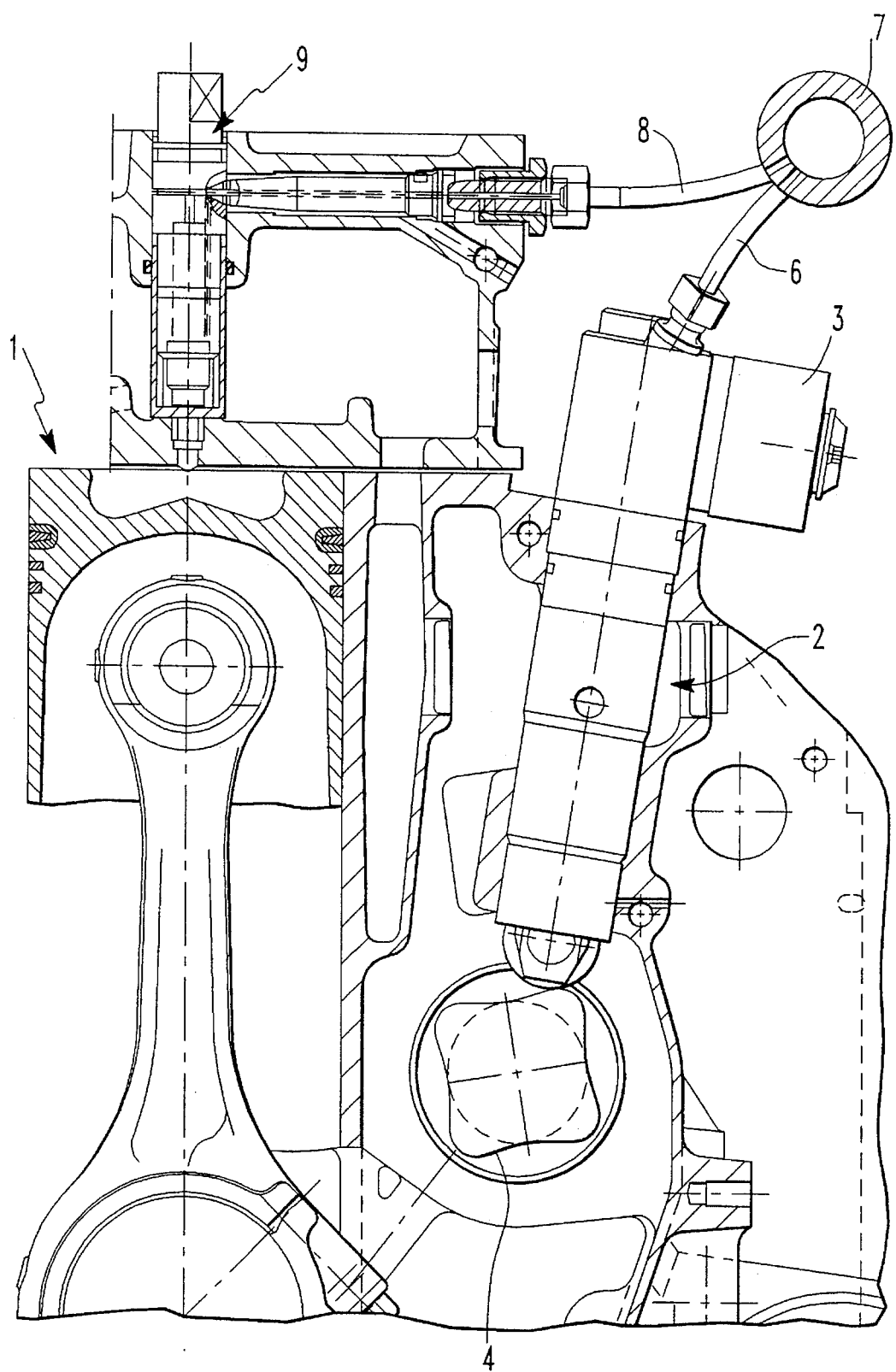
FIG. 1 shows a Diesel engine with a magnetic valve-controlled high pressure pump and a common fuel supply line for the fuel injection nozzles.

A multi-cylinder Diesel engine 1 includes, as shown in Fig. 1, at least one high pressure pump, generally a cam operated pump 2 which is removably inserted into the engine housing so as to be operated by an engine-driven camshaft, and which includes a magnetic valve 3.

The pump 2 as shown is operated by four cams 4 and supplies fuel through a high pressure line 6, which includes a check valve 5 (FIG. 2), to a common high pressure fuel supply conduit 7, from which injection pipes 8 lead to magnetic valve-controlled fuel injection nozzles 9.

Figure 2:
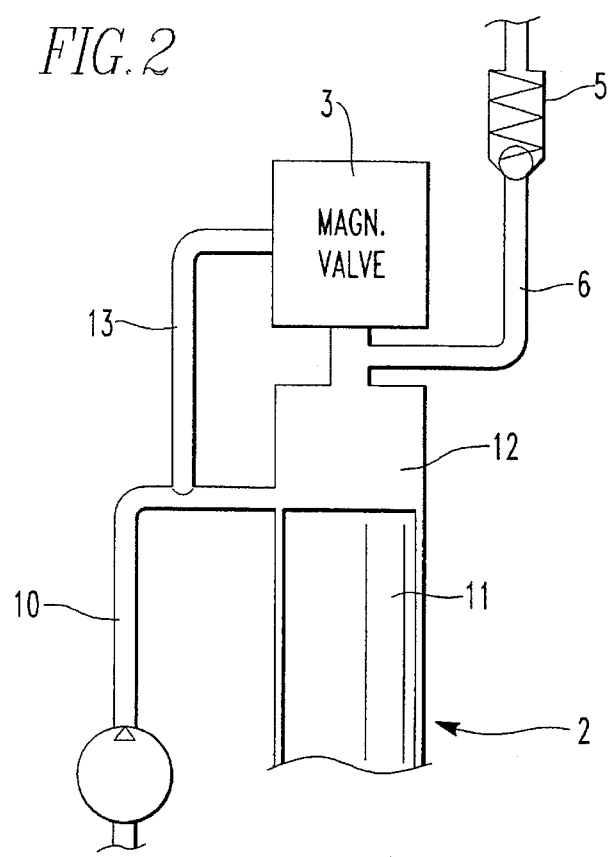
FIG. 2 shows schematically the high pressure pump with a magnetic valve.

A low pressure fuel conduit 10 leads to the operating chamber 12 of the pump 2 which is delineated by the pump piston 11 (FIG. 2). A control line 13 interconnects the operating chamber 12 and the low pressure fuel conduit 10 via the magnetic valve 3 which is controlled by an electronic control unit (not shown) depending on engine operating parameters. The magnetic valve is so controlled that it provides for a fuel supply dependent on the fuel requirements by variable pump delivery start and delivery end with the particular provision that the opening of the magnetic valve at the end of delivery occurs only after a certain expansion stroke length h of the pump piston 11 as measured from the top dead center of the pump piston 11.

Figure 3:
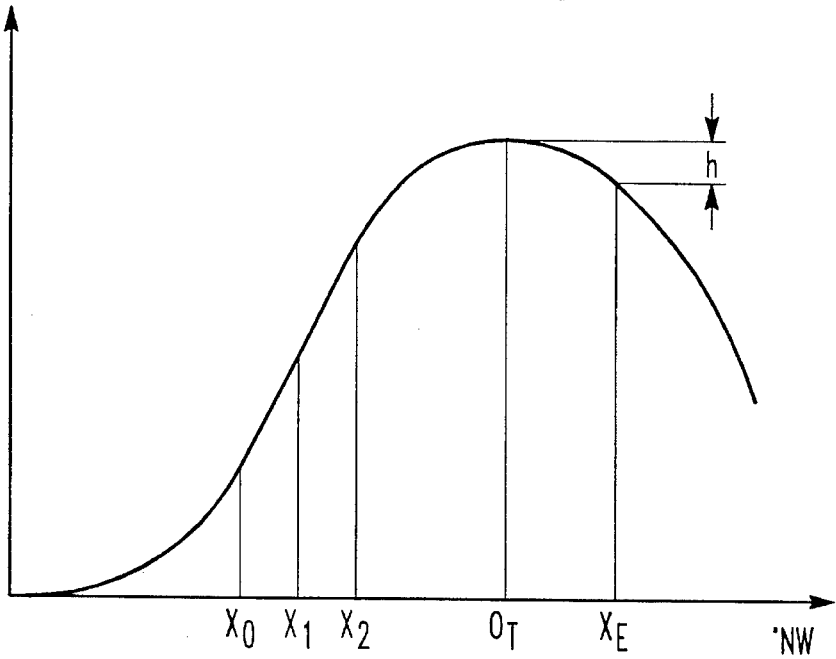
FIG. 3 is a representation of the cam lift of the pump over the degree of camshaft rotation.

FIG. 3 shows the cam lift H over camshaft rotational angle (°NW) with a variable pump delivery start $X_\otimes$, $X_1$, or $X_2$ and with a variable delivery end $X_E$, depending on the desired delivery amount. The upper dead center position of the pump piston 11 is indicated with "OT" and the variable expansion stroke length is indicated by "h".

At the pressures present in a Diesel fuel injection system, the Diesel fuel is slightly compressible and if the injection pipe walls are not extremely thick, they are in effect, slightly expandable by the extremely highly pressurized fuel. When the piston has completed the discharge stroke and the check valve has closed, the fuel pressure in the cylinder 12 will therefore not instantly collapse to zero when the piston has passed TDC, but it will take a certain expansion stroke length h during which the fuel expands and the fuel delivery pipe 6 contracts.

For a particular system, the value h can be determined by a simple test utilizing an actual cylinder and piston and a fuel line 6 having the length of the line between the cylinder and the check valve 5 as it is or will be installed in the engine. It can easily be determined termined at which piston travel length or cam lift h, after TDC, the fuel pressure in the cylinder 12 has collapsed to the value of the fuel pressure in the fuel supply line.

But the value h can also be obtained on a theoretical basis whereby the delivery end $x_E$ corresponding to h is determined by the equation:

$$h = \frac{4 \times V_s \times P}{E \times \pi \times D^2}$$

wherein $V_s$=the waste volume between the check valve and the pump piston when the piston is in TDC position, P=the pump discharge pressure corresponding to the pressure in the high pressure common fuel supply line 7, E=E-modulus (modulus of elasticity of the system particularly the fuel)

D=Diameter of the pump piston.

The expansion stroke length "h" is variably dependent on the system pressure and the pump system geometry, particularly the fuel line.

The modulus of elasticity E has been found to be generally around 15,000.

A way of calculating the modulus of elasticity is found in the publication "Gemischbildung und Verbrennung im Dieselmotor" by Dr. techn. Anton Pischinger, Vienna, Springer Publishing House. 1957. ("Mixture Formation and Combustion in a Diesel Engine").

Upon opening of the magnetic valve, the pressure in the pump is essentially the same as the pressure in the low pressure fuel line such that no pressure pulses are generated and the available compression energy is regained before the magnetic valve is opened.

As an example, the following values can be utilized for determining the expansion stroke length "h":

$V_s$ =2000 mm$^3$

P=1000 bar

E=15000 MP

D=10 mm

With these values the expansion stroke length "h" is calculated to be 1.7 mm.

What is claimed is:

1. In a method of injecting fuel for an internal combustion engine with high pressure fuel injection, comprising a high pressure pump with a pump cylinder and a pump piston disposed in the cylinder and defining therewith a pump operating chamber, a high pressure line including a check valve for supplying fuel under pressure from the high pressure pump to fuel injection nozzles for injection into the engine and a control line extending from the pump operating chamber to a low pressure fuel supply line for discharging excess fuel thereto, said fuel control line including a magnetic valve which, while open, permits the discharge of excess fuel from the pump operating chamber but which is closed to initiated pumping of fuel, the improvement wherein the magnetic valve is opened at the end of fuel pumping at a point corresponding to a piston stroke length h after the upper dead center of the piston and the length h is determined by the expansion characteristics of the third volume between the check valve and the pump piston.

2. A method according to claim 1 wherein the stroke length h is determined by the expansion of said fluid volume based on a pressure corresponding to that in the low pressure fuel supply line.

* * * * *